Nov. 8, 1955        G. E. HENNING        2,722,716
TEMPERATURE CONTROL APPARATUS
Filed Feb. 2, 1953        2 Sheets-Sheet 1
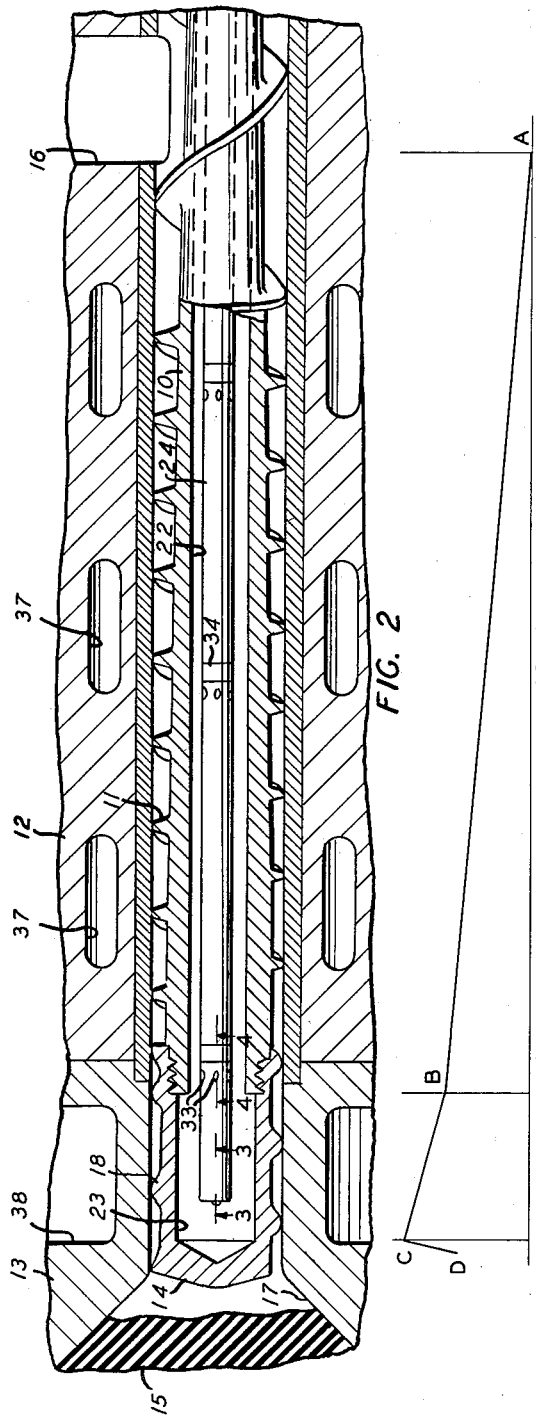
FIG. 2
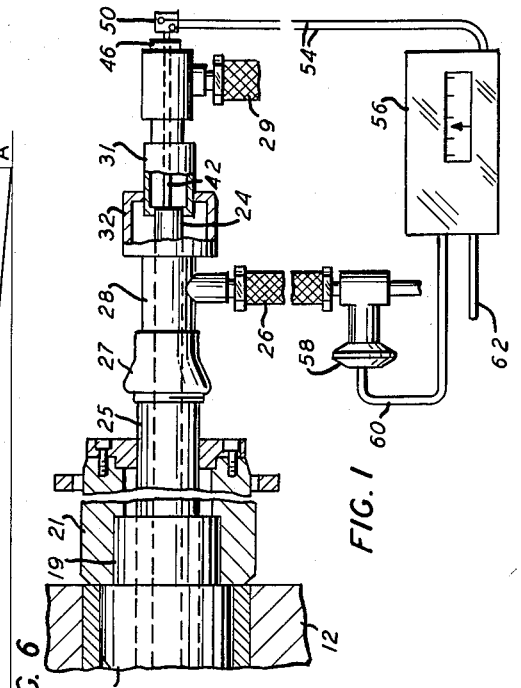
FIG. 1
FIG. 6
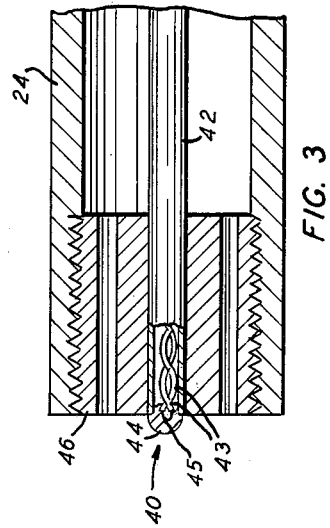
FIG. 3
INVENTOR
G. E. HENNING
BY [signature]
ATTORNEY Nov. 8, 1955  G. E. HENNING  2,722,716

TEMPERATURE CONTROL APPARATUS

Filed Feb. 2, 1953  2 Sheets-Sheet 2

INVENTOR
G. E. HENNING
BY
ATTORNEY

United States Patent Office

2,722,716
Patented Nov. 8, 1955

2,722,716

TEMPERATURE CONTROL APPARATUS

George E. Henning, Baltimore, Md., assignor to Western Electric Company, Incorporated, New York, N. Y., a corporation of New York Application February 2, 1953, Serial No. 334,642

5 Claims. (Cl. 18—12)

This invention relates to apparatus for controlling temperatures, and more particularly to apparatus for controlling the temperatures of plastic compounds advancing along stock screws in extruders.

It has long been recognized that the temperatures in the interior of an extruder must be properly regulated, in order to control the rate of production as well as the quality of the extruded product. It is important to exert such temperature control during the extrusion of thermoplastic compounds, such as polyethylene or polyvinyl chloride compounds, because the capability of a stock screw to advance such thermoplastic compounds may be critically affected by the temperature thereof. Likewise, in the case of highly accelerated, vulcanizable elastomer compounds, attention must be given to the problem of temperature control, because excessively high temperatures may cause localized premature vulcanization of such compounds to occur, and clogging of the extruder may result.

Control over the temperature of the stock screw is particularly important in the extrusion of cellular thermoplastic compounds. In the extrusion of a cellular plastic, a plastic is mixed with a heat decomposable blowing agent, and this mixture is fed into an extruder. The extrusion temperature should be so controlled that as the product issues from the extruder, the gas evolved by heat-decomposition of the blowing agent expands the plastic into a cellular form containing a multiplicity of gas-filled cells uniformly distributed throughout the product. These cells should be minute and of uniform size to obtain the best electrical and physical characteristics in the extruded product. Excessively high temperatures may cause the blown cells therein to be too large, and the size of the cells to be uneven. On the other hand, at low temperatures the blowing agent may fail to decompose completely. Moreover, the extrusion temperature has a strong influence upon the rate at which the extruder delivers the product.

The procedure of controlling extrusion temperatures by providing a plurality of annular channels for circulating a cooling fluid around the exterior of an extrusion bore in which a stock screw rotates, is well known in the extrusion art. The practice of supplying a cooling medium under pressure to a tube disposed within a longitudinal bore formed in the interior of the stock screw, is also well recognized. The effectiveness of these prior practices has been limited to preventing the stock screw from overheating at the delivery end thereof, and to providing a crude control over the temperatures along the extrusion bore.

In G. E. Henning Patent 2,688,770, granted September 14, 1954, there is disclosed and claimed a system for controlling the temperatures at intervals all along the stock screw, rather than merely at the delivery end of the screw. In this respect the system described in said Henning patent represents an improvement over the prior art. However, some extrusion operations, such as the extrusion of cellular plastics, require an even more delicate control over the temperatures of the stock screw. Furthermore, it is desirable to have the temperature control system automatically responsive to variations in the temperature of the stock screw, in order to keep the temperature within a selected optimum range.

An object of this invention is to provide new and improved apparatus for controlling temperatures.

Another object of this invention is to provide new and improved apparatus for controlling the temperatures of plastic compounds advancing along stock screws in extruders.

An apparatus illustrating certain features of the invention may include a stock screw having a longitudinal bore therein, means for admitting a cooling medium under pressure into the bore, temperature sensitive means located in the bore, and means responsive to the temperature sensitive means for controlling the rate at which the cooling medium is admitted.

A complete understanding of the invention may be obtained from the following detailed description of apparatus forming a specific embodiment thereof, when read in conjunction with the appended drawings, in which:

Fig. 1 is a vertical, longitudinal, partially sectional view of the entrance end portion of a stock screw for an extruder, embodying certain features of the invention;

Fig. 2 is a continuation of the left hand end of Fig. 1, showing the remaining portion of the stock screw;

Fig. 3 is an enlarged, fragmentary sectional view taken along line 3—3 of Fig. 2;

Fig. 6 is a diagram of an ideal temperature gradient for plastic material disposed along the stock screw illustrated in Fig. 2.

Figure 4:
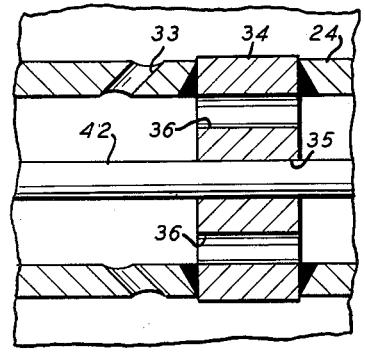
Fig. 4 is an enlarged, fragmentary sectional view taken along line 4—4 of Fig. 2.

Referring now in detail to the drawings a stock screw 10 having a helical rib 11 is disposed longitudinally within an imperforate extrusion cylinder 12. The clearance is extremely small between the top of the helical rib 11 and the wall of the cylinder 12 so that a plastic material may be positively advanced by the stock screw 10. A cylindrical casing 13 is secured to the exit end of the extrusion cylinder 12 and an extension 14 threadedly secured to the delivery end portion of the stock screw 10 is positioned within the cylindrical wall of the casing 13. The stock screw 10 and its extension 14 are designed to advance a mass of plastic material 15 from an entrance hopper 16 to a delivery orifice 17 and to plasticize the material while it is being so advanced.

The top of the helical rib 11 is equidistantly, closely spaced from the wall of the extrusion cylinder 12 throughout the length of the stock screw 10 from the entrance end portion to the delivery end portion thereof. However, the root portion of the stock screw 10 is tapered to increase in diameter from the entrance end portion to the delivery end portion thereof so that the plastic material will receive a working action as it is advanced therealong. Certain features of this type of stock screw are described and claimed in A. N. Gray Patent 2,547,000, issued April 3, 1951.

At the delivery end portion of the stock screw 10 the advancing plastic material is given a severe working action by the extension 14. A plurality of round-topped, helical ribs 18—18 formed on the extension 14 are closely spaced from the cylindrical casing 13. The pitch and clearance of these ribs are such that the plastic material is subjected to an extremely vigorous working or kneading action at this point.

Secured to the end of the stock screw 10 near the entrance end portion thereof, is a boss 19 which extends into a gearing housing 21. This housing is associated with conventional driving means (not shown) which serves to rotate the stock screw 10 and its extension 14.

The temperature of the plastic material being advanced along the stock screw 10 and its extension 14, is controlled primarily by means located within the body of the screw and its extension. For this purpose the stock screw 10 is an interior cylindrical bore 22, and the extension 14 is provided with an interior chamber 23, through which a cooling medium may be circulated. An elongated pipe 24 is disposed longitudinally throughout the length of the interior bore 22, and may protrude into the chamber 23 of the extension 14. An extension pipe 25 is secured to the boss 19, and the interior bore 22 is in communication with a supply pipe 26 through the extension pipe 25, a rotatable sealing coupling 27, and a T-shaped pipe 28. The elongated pipe 24 is in communication with a drain pipe 29 through a fixed coupling 31 having a housing 32 joined to the T-shaped pipe 28.

At intervals along its length the pipe 24 is provided with a plurality of ports 33—33 through which the cooling medium may flow between the interior and the exterior of this pipe. Groups of the ports 33—33 are spaced circumferentially around the pipe 24 at intervals along its length. These groups of ports may be spaced at intervals of equal length from one end of the pipe 24 to the other end thereof, as they are illustrated in Fig. 2, or they may be distributed in other patterns, as desired. The distribution of these groups of ports controls the circulation of the cooling medium along the cylindrical bore 22 formed within the stock screw 10.

In some installations a plurality of plugs 34—34 are provided to assist in controlling the flow of the cooling medium along the interior of the stock screw 10. The use of such plugs as flow regulators is optional, but one plug may be located adjacent to each interval where the ports are located. Each plug 34 is provided with an axial bore 35 (Fig. 4), and spaced radially from the bore 35 are a plurality of channels 36—36 through which the cooling medium flows through the plugs as it traverses the interior of the pipe 24. As shown in Fig. 4, the plugs 34—34 are joined permanently to adjacent sections of the pipe 24. For some installations it may be considered desirable to make the plugs 34—34 removable to facilitate changing the size of plugs employed. This may be accomplished by constructing such plugs in the form of threaded sleeves (not shown) designed to engage threaded portions formed on the adjacent sections of the pipe 24.

In the customary manner, an auxiliary means may be provided exterior to the stock screw 10 and its extension 14, to aid in controlling the temperature of the advancing plastic material. Such means may include a plurality of annular channels 37—37 surrounding the extrusion cylinder 12, and an annular channel 38 located within the cylindrical casing 13. A hot or a cold fluid, as desired, may be circulated through the annular channels 37—37 and 38.

The relative temperature of the plastic material at successive points along its path of travel, while being advanced by the stock screw 10 and the extension 14, may be illustrated by a curve similar to the one shown diagrammatically in Fig. 6. The temperature gradient shows a gradual rise from about room temperature at the entrance end of the stock screw 10, indicated at point A, to the delivery end portion of the stock screw, indicated at point B, and then rises at a somewhat greater slope to the delivery end portion of the extension 14, designated point C, at which point the temperature drops rather abruptly to point D. This gradient represents ideal temperature conditions prevailing as a result of proper functioning of the temperature controlling system for a stock screw and a stock screw extension of this type.

As the plastic material is advanced and kneaded by the stock screw 10 and then given a vigorous working treatment by the extension 14, a considerable amount of heat is generated in the material. It is the function of the temperature controlling system to dissipate this heat, and to control the dissipation of the heat at various stages of the advancing and working process so that the temperature conditions prevailing in the plastic material will approximate those represented in Fig. 6. The clearance between the ribs 18—18 of the extension 14 and the surrounding wall of the casing 13 is so small, and the helix angle of the ribs 18—18 is such, that the greatest amount of heat is generated during the exceedingly vigorous working action which occurs at this stage. While a high temperature is necessary in order to assist this kneading action, the compound should not be allowed to become overheated.

In the case of a thermoplastic compound, if its temperature were not controlled the material may behave so much like a fluid that the helical ribs would be unable to exert an advancing action thereon. In processing a thermoplastic compound, the delivery characteristics of an extrusion screw may be materially affected by the temperature of the compound in the pusher section of the screw. The primary function of the stock screw 10 is to advance the plastic material, and the portion of the extrusion apparatus occupied by the stock screw 10 may be termed the pusher section, whereas the primary function of the extension 14 is to knead the plastic material, and this portion of the apparatus may be termed the plasticizing section. If a thermoplastic compound becomes overheated in the pusher section, its viscosity may become so low that the stock screw will be incapable of building up sufficient pressure in this section to advance the compound efficiently and force it through the plasticizing section of the apparatus.

A cooling medium, such as cold water, introduced through the supply pipe 26 flows along the exterior of the elongated pipe 24, and at the intervals where the ports 33—33 are encountered, minor portions of the incoming fluid are diverted through these ports and counterflowed back along the bore 22 through the interior of the pipe 24 towards the discharge pipe 29. As a result of successive counterflowing of predetermined portions of the water through the pipe 24, the temperature gradients of the incoming and of the outgoing water would appear as staggered curves. However, the resultant cooling effect upon the plastic material disposed along the stock screw 10 and its extension 14 makes the temperature gradient in this material approximate the curve illustrated diagrammatically in Fig. 6.

Manifestly, the use of a cooling tube having ports at spaced intervals therealong would be most advantageous in a pressure cooling system, i. e., a system in which the cooling fluid is admitted under pressure into the interior of the stock screw. In this instance, an increase in the volume of fluid admitted causes a correspondingly increased cooling effect at each of the diversion points along the screw, in proportion to the amount of fluid diverted. If the cooling tube did not possess these ports, an increase in the volume of cooling medium admitted would primarily affect that portion of the screw beyond the discharge end of the cooling tube. Using a cooling system of the type described herein, it is possible to increase greatly the relative amount of fluid being admitted, without greatly decreasing the temperature at the delivery end of the extruding screw, the primary effect being obtained in the pusher section of the extrusion screw.

It is evident that the flow regulators 34—34 may assume other configurations, and that these flow regulators may even be omitted, but that the essential idea is to successively divert minor portions of the cooling fluid through ports located at intervals along an elongated pipe disposed within the screw, and to counterflow all of the fluid back along and around said pipe within the interior bore of the extruding screw. The cooling medium may also be admitted through the pipe 29 and conveyed along the interior bore 22 through the interior of the pipe 24 be diverted outwardly through the ports 33—33 and counterflowed along the exterior of the pipe 24 to the pipe 26. In the one case the incoming fluid flows along the exterior of the pipe 24 in the same direction as that in which the plastic compound is advanced by the stock screw 10, while in the other case the flow of incoming fluid along the exterior of the pipe 24 is in the opposite direction from that in which the plastic compound is being advanced. Further details of such temperature control systems are given in the aforesaid Henning patent.

In order to keep the temperature gradient along the stock screw 10 within a selected optimum range, the rate at which the stock screw is cooled is made automatically responsive to variations in the temperature thereof. A thermocouple 40 is mounted within a rigid tube 42 which extends axially through the pipe 24 and through the axial bores, such as the bore 35, in the plugs 34—34 mounted in the pipe 24. The thermocouple 40 is formed from a pair of twisted wires 43—43 composed of dissimilar metals and individually insulated by coverings made of braided glass yarn. The insulation is removed from one end of each of the wires 43—43, and a silver solder bead 44 joins the bare ends of the wires 43—43 at a junction 45 and at the same time forms a liquid seal for this end of the tube 42. Due to the great length of the tube 42, it is desirable to have the metal forming one of the wires 43—43 be dissimilar from the metal forming the other one of the wires 43—43 throughout the entire length of the tube 42, in order to minimize electrical losses. Normally, the junction 45 of the thermocouple 40 is located in the chamber 23 formed in the extension 14 of the stock screw 10. However, the tube 42 may be moved longitudinally through the pipe 24 to make the junction 45 respond to the temperatures at any selected point along the interior of the stock screw 10.

Figure 5:
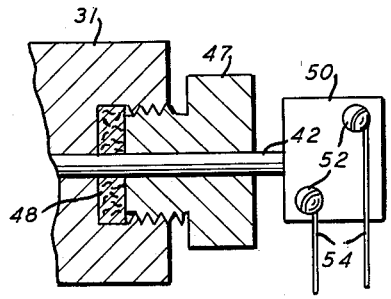
Fig. 5 is an enlarged elevation, partially in section, of one end of the apparatus shown in Fig. 1.

When the junction 45 is located in the chamber 23, this end of the tube 42 is located in an apertured plug 46, which is threaded into the end of the pipe 24 through which the tube 42 is longitudinally movable. The other end of the tube 42 extends through an adjustable seal 47 (Fig. 5) having a compressible gasket 48 therein. The seal 47 is secured to the end of the fixed coupling 31 to which the drain pipe 29 is connected. Beyond the seal 47 this end of the tube 42 is provided with a block 50 having a pair of terminals 52—52 mounted thereon. The pair of dissimilar wires 43—43 extending through the tube 42 connect the junction 45 with the terminals 52—52. A pair of conductors 54—54 (Fig. 5) provide an electrical connection between the terminals 52—52 and a controller 56 which is responsive to temperatures affecting the thermocouple. To move the junction 45 from the chamber 23 to a selected location along the stock screw 10, an operator may grasp the block 50 on the end of the tube 42, and pull the block away from the seal 47 to slide the tube 42 along the pipe 24 the desired distance. The operator can determine the approximate location of the junction 45 inside the stock screw 10 by the length of the portion of the tube 42 which protrudes beyond the seal 47.

The controller 56 is designed to actuate a diaphragm valve 58 located in the supply pipe 26 to regulate the amount of cooling medium admitted through the pipe 26 in response to temperatures affecting the junction 45 of the thermocouple 40. The valve 58 is operated by compressed air carrier through a line 60 connecting this valve to the controller 56. Compressed air is supplied to the controller 56 through a line 62, and an air valve 64 (Fig. 7) within the controller regulates the supply of air transmitted to the valve 58 through the line 60. The controller 56 can be adjusted to actuate the air valve 64 at any selected temperature affecting the thermocouple 40.

Figure 7:
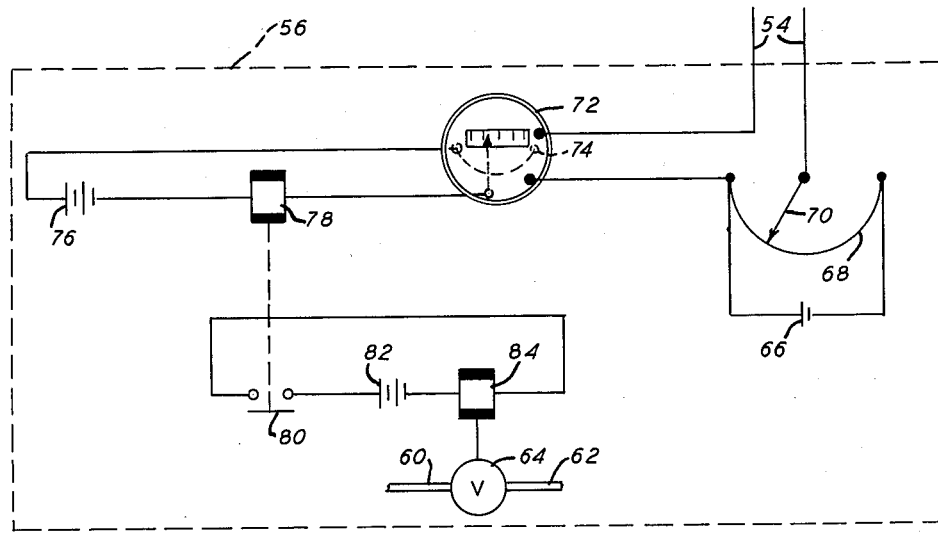
Fig. 7 is a diagram of an electrical control circuit associated with the apparatus shown in Figs. 1 and 2.

The control circuit, shown diagrammatically in Fig. 7, includes a battery 66 connected in series with a slide wire rheostat 68 forming part of a potentiometer branch circuit. One of the leads 54—54 from the thermocouple 40 is connected to a variable arm 70 of the rheostat 68. The other one of the leads 54—54 is connected to one terminal of the rheostat 68 and is in series with an ammeter 72 which registers any flow of current in a thermocouple branch circuit. In this arrangement, the electromotive force generated by the thermocouple 40 opposes the electromotive force in the potentiometer branch circuit supplied by the battery 66. When these forces are balanced no current flows in the thermocouple branch circuit, but when they are unbalanced a proportionate flow occurs and is registered on the ammeter 72. When the flow rises to a predetermined value, a contactor 74 in the ammeter 72 closes, and thereby complete a circuit through a battery 76 and a relay 78 connected in series. When the contactor 74 closes, the relay 78 is energized by current from the battery 76 and the energized relay 78 closes a switch 80 connecting a power source 82 to a solenoid 84 which operates the air valve 64.

By sliding the variable arm 70 to the proper position on the slide wire rheostat 68, the quantity of current that will flow in the thermocouple branch of the circuit can be controlled for any specified temperature affecting the junction 45 of the thermocouple 40. These temperatures may be indicated by calibrating the ammeter 72 in terms of degrees, or these temperatures may be recorded graphically by a moving stylus (not shown) of a conventional type. Control instruments similar to the controller 56 are readily obtainable in the commercial market. A suitable source of such devices is The Brown Instrument Co. of Philadelphia, Pa., a division of Minneapolis-Honeywell Regulator Co.

During the extrusion of a cellular plastic, the controller 56 may be set to respond to any desired temperature within the range of about 100° F. to about 300° F., to maintain the desired temperature at a selected location in the stock screw 10. The controller 56 varies the supply of compressed air to the valve 58 to open or close this valve, as may be required, to regulate the amount of cooling medium being admitted through the supply pipe 26. Although it is possible to provide an intermediate control to open the valve 58 to any partial degree, satisfactory results can be obtained when the extent of control is limited to opening or closing the valve fully. Normally, the junction 45 of the thermocouple 40 is located in the chamber 23 formed in the extension 14 of the stock screw 10, and it functions to maintain a temperature of about 150° F. at this location.

It is in the extrusion of cellular plastics that the present invention finds its most useful application. The extrusion temperature and pressure have a critical effect upon the size and uniformity of the gas-filled cells present in such expanded plastics. Hence, the temperatures along the stock screw must be controlled with much greater precision than is the case during the extrusion of solid plastics. The use of the thermocouple in the interior of the stock screw in conjunction with the automatic flow regulator for the cooling medium, as well as the particular manner in which the cooling medium is diverted along the interior of the stock screw, make it possible for apparatus embodying the present invention to exert the precise temperature control necessary for the extrusion of cellular plastics.

For the extrusion of solid plastics, satisfactory control over the extrusion temperature might be realized by the use of a pipe not having spaced ports in the interior of the stock screw, i. e. an imperforate pipe which discharges all of the incoming cooling medium into the chamber in the delivery end of the stock screw. In such case, satisfactory results might be obtained by placing a thermocouple in the drain pipe outside of the extruder, to regulate the flow of incoming cooling medium in accordance with changes in the temperature of the outgoing cooling medium. The manner in which portions of the cooling medium are successively diverted through the ports 33—33 at intervals along the pipe 24, makes the present invention quite sensitive to temperature changes at the delivery end of the stock screw 10. It is evident that a thermocouple located in the drain pipe 29 would not be as sensitive to temperature changes in the chamber 23 as would a thermocouple located in this chamber.

Ordinary tap water from a city supply system may be employed to cool the interiors of extruders. Such water may have a temperature of about 60° F. and may be under a pressure of about 55 to about 65 pounds per square inch. When the water approaches its boiling point in the interior of the stock screw, the temperatures recorded by the meter 66 fluctuate greatly. The boiling point of water supplied at 60 pounds per square inch is about 260° F. In order to operate the extruder at higher temperatures and to avoid fluctuating temperatures near the boiling point of the water, it is advisable to install an auxiliary pump to boost the pressure of the supply water above 65 pounds per square inch.

This invention is not limited to the particular type of stock screw and extension illustrated. The problem of obtaining adequate heat exchange to control temperatures satisfactorily is ordinarily greater in the case of extrusion screws of large diameter, and apparatus embodying the invention may be employed most advantageously in such case. The merits of the invention are especially evident in the extrusion of cellular thermoplastic compounds.

What is claimed is:

1. Apparatus for controlling the temperature of plastic material within an extruder, which comprises a stock screw having a longitudinal bore which is open at an entrance end portion of the screw and is closed at a delivery end portion of the screw, means for introducing a cooling fluid into the bore through the open end thereof, a thermocouple located in the bore near the delivery end portion of the screw, and means responsive to the thermocouple for controlling the rate at which the cooling fluid is introduced into the bore.

2. Apparatus for controlling the temperature of plastic material within an extruder, which comprises a stock screw having a longitudinal bore which is open at an entrance end portion of the screw and is closed at a delivery end portion of the screw, means for introducing a cooling fluid into the bore through the open end thereof, a thermocouple positioned in the bore, means for moving the thermocouple along the bore to any selected location between the entrance end portion and the delivery end portion of the screw, and means responsive to the thermocouple for controlling the rate at which the cooling fluid is introduced into the bore.

3. Apparatus for controlling the temperature of plastic material within an extruder, which comprises a stock screw having a longitudinal bore which is open at an entrance end portion of the screw and is closed at a delivery end portion of the screw, means for introducing a cooling fluid into the bore through the open end thereof, means for flowing the cooling fluid along the bore to the closed end thereof, means located at intervals along the bore for successively counterflowing predetermined minor portions of the fluid along the bore to the open end thereof, thereby maintaining a predetermined temperature gradient in the plastic material disposed along the stock screw, a thermocouple positioned in the bore, means for positioning the thermocouple along the bore at any selected location between the entrance end portion and the delivery end portion of the screw, and means responsive to the thermocouple for controlling the rate at which the cooling fluid is introduced into the bore.

4. Apparatus for controlling the temperature of plastic material within an extruder, which comprises a stock screw having a longitudinal bore which is open at an entrance end portion of the screw and is closed at a delivery end portion of the screw, an elongated pipe disposed longitudinally within and extending along the bore from the open end to the closed end thereof, a supply pipe communicating with the open end of the bore for introducing a cooling fluid under pressure, a valve located in the supply pipe for regulating the rate at which the cooling fluid is introduced into the bore, said elongated pipe having a plurality of ports located at intervals along its length for counterflowing predetermined minor portions of the fluid towards the open end of the bore, an elongated tube extending axially through and movable longitudinally within the bore, a thermocouple secured to the tube so that the thermocouple may be moved to any selected location in the bore between the entrance end portion and the delivery end portion of the screw, and means responsive to the thermocouple for regulating the valve to maintain the temperature within a predetermined range.

5. Apparatus for controlling the temperature of plastic material within an extruder, which comprises a stock screw having a longitudinal bore which is open at an entrance end portion of the screw and extends to a chamber at a delivery end portion of the screw, an elongated pipe disposed longitudinally within and extending along the bore from the open end thereof to the chamber, a supply pipe connected to the elongated pipe near the open end of the bore for introducing a cooling fluid under pressure, a valve located in the supply pipe for regulating the rate at which the cooling fluid is introduced into the elongated pipe, said elongated pipe having a plurality of ports located at intervals along its length for counterflowing predetermined minor portions of the fluid towards the open end of the bore, a tube extending axially through the elongated pipe and having one end protruding beyond said pipe at the open end of the bore, a thermocouple secured to the other end of the tube, said tube being longitudinally movable within the elongated pipe so that the thermocouple may be moved to any selected location therein between the chamber and the open end of the bore, and a controller adjustable to respond to the thermocouple at a selected temperature for regulating the valve to maintain the temperature within a predetermined range.

References Cited in the file of this patent

UNITED STATES PATENTS

| | | |
|---|---|---|
| 2,589,323 | Ashley et al. | Mar. 18, 1952 |
| 2,641,800 | Myers | June 16, 1953 |
| 2,653,348 | Elgin et al. | Sept. 29, 1953 |